United States Patent
Muneshima et al.

(10) Patent No.: US 8,452,462 B2
(45) Date of Patent: May 28, 2013

(54) SYSTEM STABILIZING DEVICE

(75) Inventors: Masakazu Muneshima, Tokyo (JP); Kazunobu Oi, Tokyo (JP); Tatsuya Kohara, Tokyo (JP)

(73) Assignee: Meidensha Corporation, Tokyo (JP)

( * ) Notice: Subject to any disclaimer, the term of this patent is extended or adjusted under 35 U.S.C. 154(b) by 326 days.

(21) Appl. No.: 12/990,602

(22) PCT Filed: May 8, 2009

(86) PCT No.: PCT/JP2009/058703
§ 371 (c)(1),
(2), (4) Date: Jan. 11, 2011

(87) PCT Pub. No.: WO2009/136641
PCT Pub. Date: Nov. 12, 2009

(65) Prior Publication Data
US 2011/0118886 A1    May 19, 2011

(30) Foreign Application Priority Data

May 9, 2008    (JP) .................................. 2008-123041

(51) Int. Cl.
G05D 11/00    (2006.01)
(52) U.S. Cl.
USPC ............................. 700/293; 363/131; 322/58
(58) Field of Classification Search
USPC ............................. 700/293; 363/131; 322/58
See application file for complete search history.

(56) References Cited

U.S. PATENT DOCUMENTS

| 4,999,564 A * | 3/1991 | D'Antonio et al. ............. 322/99 |
| 7,113,411 B2 * | 9/2006 | Hosotani et al. ................ 363/16 |
| 7,430,948 B2 * | 10/2008 | De Marco et al. .............. 83/236 |
| 8,004,252 B2 * | 8/2011 | Sihler et al. ..................... 322/58 |
| 2001/0012211 A1 * | 8/2001 | Hasegawa et al. ............ 363/131 |

FOREIGN PATENT DOCUMENTS

| JP | 10-014251 | 1/1998 |
| JP | 2001-292531 | 10/2001 |
| JP | 2003-235162 | 8/2003 |
| JP | 2006-333563 | 12/2006 |
| JP | 2007-020361 | 1/2007 |

OTHER PUBLICATIONS

International Search Report issued in corresponding application PCT/JP2009/058703.

* cited by examiner

Primary Examiner — Mohammad Ali
Assistant Examiner — Anthony Whittington
(74) Attorney, Agent, or Firm — Foley & Lardner LLP

(57) ABSTRACT

A control unit of a system stabilizing device uses a fluctuation detecting block 200 for determining current commands from a system current. A fluctuation detecting unit 300 determines, from an active component $I_{sd}$ of the system current, a common current command $I_{refd}0$ which is a fluctuation component of the active component $I_{sd}$. A first current command creating unit 400 receives as an input the current command $I_{refd}0$, and outputs a current command $I_{refd}1$ whose signal width is as small as T4 and which instantaneously rises and then gradually decreases. A second current command creating unit 500 receives as an input the current command $I_{refd}0$, and outputs a current command $I_{refd}2$ which gradually increases for a time T4 and then gradually decreases for a time (T3-T4). The system stabilizing device having short charging and discharging times is controlled by the current command $I_{refd}1$, while the system stabilizing device having long charging and discharging times is controlled by the current command $I_{refd}2$, whereby system stabilizing controls can be exercised without interferences. In this manner, even if system stabilizing devices having different charging and discharging characteristics are provided, system stabilizing controls can be effected without interferences.

4 Claims, 8 Drawing Sheets

SYSTEM STABILIZING DEVICE

TECHNICAL FIELD

This invention relates to a system stabilizing device which is designed such that even if a plurality of the system stabilizing devices having different charging and discharging characteristics are provided in a power distribution system, system stabilizing controls can be exercised stably, with interferences between the system stabilizing devices being prevented.

BACKGROUND ART

In recent years, power generation by natural energy such as sunlight or wind power has found use.

FIG. 4 shows an example in which an existing power system (a system superior to a distribution system) 1 and a distribution system (microgrid) 10 are connected via a line impedance $L_s$ and a circuit breaker 2.

A dispersed generation plant 11 and a load 12 are connected to the distribution system 10 which is the microgrid. The dispersed generation plant 11 is illustrated as a single generator in FIG. 4. Actually, however, it is composed of a plurality of dispersed facilities for power generation, which include natural energy type power generation equipment utilizing natural energy (e.g., photovoltaic power generation equipment or wind power generation equipment), and internal combustion engine type power generation equipment driven by an internal combustion engine (e.g., diesel power generation equipment). Also, the load 12 is actually a plurality of dispersed loads.

With the microgrid 10 as shown in FIG. 4, the amount of power generation varies or fluctuates greatly according to weather conditions, wind speed, etc., because it has natural energy type power generation equipment.

In order to absorb or accommodate such fluctuations in the amount of power generation, therefore, a system stabilizing device is used.

With the internal combustion engine type power generation equipment, output power is adjusted by governor control. However, governor control is slow in response. Thus, if electric power consumed by the load 12 suddenly changes, the internal combustion engine type power generation equipment cannot follow such a sudden change (sudden excess or deficiency) in electric power. The system stabilizing device is also used for the purpose of following such a sudden change in electric power with good response, thereby assisting the internal combustion engine type power generation equipment to balance demand for and supply of electric power.

The system stabilizing device is a power converter having a power storage function, and it is also a device installed in the distribution system to make the aforementioned power compensation.

FIG. 5 shows an example in which one system stabilizing device 20 is provided in the distribution system (microgrid) 10 shown in FIG. 4. The system stabilizing device 20 is connected in parallel with the dispersed generation plant 11 and the load 12.

The system stabilizing device 20 has a control unit 21, a power converter 22 capable of performing an inverting action and a converting or rectifying action, and a direct current charging unit 23, such as an electric double layer capacitor or a lead storage battery.

The power converter 22 acts responsive to a gate signal g fed from the control unit 21. When performing a converting action, the power converter 22 converts an alternating current (AC) power obtained from the distribution system 10 into a direct current (DC) power, and charges this DC power into the direct current charging unit 23. When performing an inverting action, the power converter 22 converts the DC power kept charged in the direct current charging unit 23 into an AC power, and sends this AC power to the distribution system 10.

In the system stabilizing device 20, a system current $I_s$, which flows from the power system 1 into the distribution system 10, is detected by a current detector 24, a system voltage $V_s$ which is the voltage of the distribution system 10 is detected by a voltage detector 25, and a converter current $I_{INV}$ inputted to and outputted from the power converter 22 is detected by a current detector 26.

With the system stabilizing device 20, under normal conditions where no failure or the like occurs in the power system 1, the circuit breaker 2 comes into a connected state, so that "a system-interconnected run", an operation performed with the distribution system 10 being tied to the power system 1, is performed. During the system-interconnected run, electric power is supplied to the load 12 by the power system 1, the dispersed generation plant 11, and the system stabilizing device 20.

Under abnormal conditions where a failure occurs in the power system 1, on the other hand, the circuit breaker 2 falls into a cut-off state, and the system stabilizing device 20 makes a "self-supporting or isolated run", an operation performed with the distribution system 10 being cut off from the power system 1. During the self-supporting run, electric power is supplied to the load 12 by the dispersed generation plant 11 and the system stabilizing device 20.

The system stabilizing device 20 performs the following actions during the system-interconnected run and the self-supporting run:

(1) During the system-interconnected run, the system stabilizing device 20 acts to detect the system current $I_s$ flowing into the distribution system 10, determine a system power from the system current $I_s$, and suppress fluctuations in this system power.

(2) During the self-supporting run, the system stabilizing device 20 detects the system voltage $V_s$ within the distribution system 10, and performs a compensating action so that the voltage amplitude and frequency of this system voltage $V_s$ become stable.

Details of the control unit 21 of the system stabilizing device 20 will be described by reference to FIG. 6.

A phase-locked loop (PLL) 101 outputs a reference phase signal θ showing the phase of the system voltage $V_s$ based on the system voltage $V_s$. A sine wave generator 102 outputs a reference sine wave signal K of a rated voltage synchronized to the reference phase signal θ.

A change-over switch 103, during the system-interconnected run, has movable contacts 103a, 103b thrown to the A side as indicated by solid lines in the drawing and, during the self-supporting run, has the movable contacts 103a, 103b thrown to the B side as indicated by dashed lines in the drawing.

Next, explanations will be offered for the respective functional blocks working during the system-interconnected run, and for their control actions during the system-interconnected run, by reference to FIG. 6.

A dq transformation unit 104 dq-transforms the system current $I_s$ to a rotating coordinate system rotating in a phase indicated by the reference phase signal θ to output the active component $I_{sd}$ of the system current and the reactive component $I_{sq}$ of the system current.

A first fluctuation detecting block 105 detects the fluctuation component of the active component $I_{sd}$ of the system current on the dq-axes, and outputs it as a current command $I_{refd}$ for the active component. A second fluctuation detecting block 106 detects the fluctuation component of the reactive component $I_{sq}$ of the system current on the dq-axes, and outputs it as a current command $I_{refq}$ for the reactive component.

The fluctuation detecting blocks 105, 106 are band-pass filters having a differentiation function and a filter function, and details of their structures will be described later.

A dq transformation unit 107 dq-transforms the converter current $I_{INV}$ to a rotating coordinate system rotating in a phase indicated by the reference phase signal θ to output the active component $I_{invd}$ of the converter current and the reactive component $I_{invq}$ of the converter current.

A subtraction unit 108 subtracts the active component $I_{invd}$ of the converter current from the current command $I_{refd}$ for the active component to output a current deviation Δd for the active component. A subtraction unit 109 subtracts the reactive component $I_{invq}$ of the converter current from the current command $I_{refq}$ for the reactive component to output a current deviation Δq for the reactive component.

A current control unit 110 exercises the proportional plus integral (PI) control of the current deviation Δd for the active component to output a voltage command $V_d$ for the active component. A current control unit 111 exercises the proportional plus integral (PI) control of the current deviation Δq for the reactive component to output a voltage command $V_q$ for the reactive component.

A dq inverse transformation unit 112 applies dq inverse transformation to the voltage command $V_d$ for the active component and the voltage command $V_q$ for the reactive component to output a voltage command of a fixed coordinate system. An addition unit 113 adds the reference sine wave signal K to the voltage command of the fixed coordinate system, which has been outputted from the dq inverse transformation unit 112, to output a voltage command V* of a fixed coordinate system.

A PWM (pulse width modulation) modulator 114 PWM-modulates the voltage command V* to output the gate signal g.

In accordance with this gate signal g, action control over the power converter 22 is effected. To suppress fluctuations in the system current $I_s$ during the system-interconnected run, power is outputted from the power converter 22.

Next, explanations will be offered for the respective functional blocks working during the self-supporting run, and for their control actions during the self-supporting run, by reference to FIG. 6

A frequency detection unit 121 detects the frequency of the system voltage $V_s$ to output a frequency signal F. The frequency of the system voltage $V_s$ corresponds to the active power, and is in a corresponding relationship with the active power such that when the active power decreases, the frequency of the system voltage $V_s$ decreases, and when the active power increases, the frequency of the system voltage $V_s$ increases.

An amplitude detection unit 122 detects the amplitude of the system voltage $V_s$ to output an amplitude signal L. The amplitude of the system voltage $V_s$ corresponds to the reactive power, and is in a corresponding relationship with the reactive power such that when the reactive power decreases, the amplitude of the system voltage $V_s$ decreases, and when the reactive power increases, the amplitude of the system voltage $V_s$ increases.

A third fluctuation detecting block 123 detects the fluctuation component of the frequency signal F, and outputs it as a current command $I_{refd}$ for the active component. A fourth fluctuation detecting block 124 detects the fluctuation component of the amplitude signal L, and outputs it as a current command $I_{refq}$ for the reactive component.

The fluctuation detecting blocks 123, 124 are band-pass filters having a differentiation function and a filter function, and details of their structures will be described later.

The subtraction unit 108 subtracts the active component $I_{invd}$ of the converter current from the current command $I_{refd}$ for the active component to output a current deviation Δd for the active component. The subtraction unit 109 subtracts the reactive component $I_{invq}$ of the converter current from the current command $I_{refq}$ for the reactive component to output a current deviation Δq for the reactive component.

The current control unit 110 exercises the proportional plus integral (PI) control of the current deviation Δd for the active component to output a voltage command $V_d$ for the active component. The current control unit 111 exercises the proportional plus integral (PI) control of the current deviation Δq for the reactive component to output a voltage command $V_q$ for the reactive component.

The dq inverse transformation unit 112 applies dq inverse transformation to the voltage command $V_d$ for the active component and the voltage command $V_q$ for the reactive component to output a voltage command of a fixed coordinate system. The addition unit 113 adds the reference sine wave signal K to the voltage command of the fixed coordinate system, which has been outputted from the dq inverse transformation unit 112, to output a voltage command V* of a fixed coordinate system.

The PWM (pulse width modulation) modulator 114 PWM-modulates the voltage command V* to output the gate signal g.

In accordance with this gate signal g, action control over the power converter 22 is effected. To suppress fluctuations in the voltage amplitude and frequency of the system voltage $V_s$ during the self-supporting run, power is outputted from the power converter 22.

The fluctuation detecting blocks 105, 106, 123, 124 are composed of the band-pass filters, as stated above.

The configuration of a conventional band-pass filter 50, which can be used as the fluctuation detecting blocks 105, 106, 123, 124, will be described by reference to FIG. 7. In FIG. 7, the symbol s denotes a Laplace operator showing a differentiation function.

As shown in FIG. 7, this band-pass filter (fluctuation detecting block) 50 is composed of a low-pass filter 51, a low-pass filter 52, and a subtracter 53.

The pass band frequency of the band-pass filter 50 is determined in accordance with filtering characteristics required of the respective fluctuation detecting blocks 105, 106, 123, 124. The cut-off frequency on the high frequency side of the determined pass band frequency is set to be f1, and the cut-off frequency on the low frequency side of the determined pass band frequency is set to be f2.

Thus, the low-pass filter 51 for noise removal has a cut-off frequency set at f1, and a time constant set at T1. The low-pass filter 52 for setting the fluctuation detection time has a cut-off frequency set at f2, and a time constant set at T2. In this case, f1=1/T1, and f2=1/T2.

The low-pass filter 51 is a filter having first order lag characteristics whose time constant is set to be the time constant T1 determined for the purpose of noise removal.

The low-pass filter 52 is a filter having first order lag characteristics whose time constant is set to be the time constant T2 determined for the purpose of setting the time for detecting fluctuations.

Upon entry of an input signal, both filters 51 and 52 utilize their filtering characteristics to filter the input signal.

If the band-pass filter (fluctuation detecting block) 50 is the fluctuation detecting block 105, the input signal is the active component $I_{sd}$ of the system current.

If the band-pass filter (fluctuation detecting block) 50 is the fluctuation detecting block 106, the input signal is the reactive component $I_{sq}$ of the system current.

If the band-pass filter (fluctuation detecting block) 50 is the fluctuation detecting block 123, the input signal is the frequency signal F.

If the band-pass filter (fluctuation detecting block) 50 is the fluctuation detecting block 124, the input signal is the amplitude signal L.

The subtracter 53 outputs a signal obtained by subtracting the signal outputted from the low-pass filter 52 from the signal outputted from the low-pass filter 51. The signal outputted from the subtracter 53 is a fluctuation component signal.

If the band-pass filter (fluctuation detecting block) 50 is the fluctuation detecting block 105, the fluctuation component signal is the current command $I_{refd}$ for the active component which is the fluctuation component of the active component $I_{sd}$ of the system current.

If the band-pass filter (fluctuation detecting block) 50 is the fluctuation detecting block 106, the fluctuation component signal is the current command $I_{refd}$ for the reactive component which is the fluctuation component of the reactive component $I_{sq}$ of the system current.

If the band-pass filter (fluctuation detecting block) 50 is the fluctuation detecting block 123, the fluctuation component signal is the current command $I_{refd}$ for the active component which is the fluctuation component of the frequency signal F.

If the band-pass filter (fluctuation detecting block) 50 is the fluctuation detecting block 124, the fluctuation component signal is the current command $I_{refq}$ for the reactive component which is the fluctuation component of the amplitude signal L.

FIG. 8 shows an example in which two system stabilizing devices 20-1 and 20-2 are provided in the distribution system (microgrid) 10 shown in FIG. 4. The system stabilizing devices 20-1 and 20-2 are connected in parallel with the dispersed generation plant 11 and the load 12.

The system stabilizing devices 20-1 and 20-2 have the same configuration as that of the system stabilizing device 20 shown in FIG. 5. A direct current charging unit 23-1 provided in the system stabilizing device 20-1 is an electric double layer capacitor, while a direct current charging unit 23-2 provided in the system stabilizing device 20-2 is a lead storage battery.

A control unit 21-1 of the system stabilizing device 20-1 has the same configuration as that of the control unit 21 shown in FIG. 6. The control unit 21-1 takes in the system current $I_s$ detected by the current detector 24, a system voltage $V_s1$ detected by a voltage detector 25-1, and a converter current $I_{INV}1$ detected by a current detector 26-1, and outputs a gate signal g1. In response to the gate signal g1, a power converter 22-1, when performing a converting action, converts an alternating current (AC) power obtained from the distribution system 10 into a direct current (DC) power, and charges this DC power into the direct current charging unit (electric double layer capacitor) 23-1. When performing an inverting action responsive to the gate signal g1, the power converter 22-1 converts the DC power kept charged in the direct current charging unit (electric double layer capacitor) 23-1 into an AC power, and sends this AC power to the distribution system 10.

The control unit 21-1, like the control unit 21 shown in FIG. 6, has the fluctuation detecting blocks 105, 106, 123, 124.

The direct current charging unit 23-1 of the system stabilizing device 20-1 is an electric double layer capacitor which has a low storage capacity, although its life is not influenced even when it performs high speed charging and discharging. Thus, the system stabilizing device 20-1 using the electric double layer capacitor as the direct current charging unit 23-1 makes compensation for power fluctuations by performing high speed charging and discharging in a short time.

A control unit 21-2 of the system stabilizing device 20-2 has the same configuration as that of the control unit 21 shown in FIG. 6. The control unit 21-2 takes in the system current $I_s$ detected by the current detector 24, a system voltage $V_s2$ detected by a voltage detector 25-2, and a converter current $I_{INV}2$ detected by a current detector 26-2, and outputs a gate signal g2. In response to the gate signal g2, a power converter 22-2, when performing a converting action, converts an alternating current (AC) power obtained from the distribution system 10 into a direct current (DC) power, and charges this DC power into the direct current charging unit (lead storage battery) 23-2. When performing an inverting action responsive to the gate signal g2, the power converter 22-2 converts the DC power kept charged in the direct current charging unit (lead storage battery) 23-2 into an AC power, and sends this AC power to the distribution system 10.

The control unit 21-2, like the control unit 21 shown in FIG. 6, has the fluctuation detecting blocks 105, 106, 123, 124.

The direct current charging unit 23-2 of the system stabilizing device 20-2 is a lead storage battery which is capable of long-term charging and discharging, but whose life deteriorates when it performs deep charging and discharging in a short time. Thus, the system stabilizing device 20-2 using the electric double layer capacitor as the direct current charging unit 23-2 does not perform high speed charging and discharging in a short time, but causes rises in charging and discharging over time, and carries out long-term charging and discharging.

PRIOR ART DOCUMENTS

Patent Documents
Patent Document 1: JP-A-10-14251
Patent Document 2: JP-A-2006-333563

SUMMARY OF THE INVENTION

Problems to be Solved by the Invention

If the two system stabilizing devices 20-1 and 20-2 are arranged in the one distribution system, as shown in FIG. 8, the problem arises that unless both devices are not cooperatively run, the output power of the system stabilizing device 20-1 and the output power of the system stabilizing device 20-2 interfere with each other, resulting in the failure to compensate for fluctuations in the system current.

In order for the two system stabilizing devices 20-1 and 20-2 to exercise system stabilizing control without interferences, it is necessary to monitor the output powers and output currents of the system stabilizing device 20-1, the system stabilizing device 20-2, and the dispersed generation plant 11, issue commands for output powers and output currents which the system stabilizing device 20-1, the system stabilizing device 20-2 and the dispersed generation plant 11, respectively, should output, and operatively control the system stabilizing device 20-1, the system stabilizing device 20-2 and the dispersed generation plant 11 under these commands.

Patent Document 2 (JP-A-2006-333563), for example, discloses a technology for performing the cooperative run of plural types of dispersed generation plants. It is possible to operate the two system stabilizing devices 20-1 and 20-2 by utilizing the technology shown in Patent Document 2.

However, the problem is posed that monitoring means for monitoring the output powers and output currents of the system stabilizing device 20-1, the system stabilizing device 20-2 and the dispersed generation plant 11, and control means for operatively controlling each system stabilizing device and the dispersed generation plant according to the results of monitoring are additionally needed.

The present invention has been accomplished in the light of the above-described conventional technologies. It is an object of the invention to provide a system stabilizing device which is designed such that even if a plurality of the system stabilizing devices having different charging and discharging characteristics are provided in a power distribution system, stable system stabilizing control can be exercised, with interferences between the system stabilizing devices being prevented, without monitoring of each system stabilizing device and the dispersed generation plant.

Means for Solving the Problems

A constitution of the present invention for solving the above problems is a system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, the first to fourth fluctuation detecting blocks are each composed of a fluctuation detecting unit (300) for outputting a common current command; a first current command creating unit (400) for receiving as an input the common current command and outputting a first current command; and a second current command creating unit (500) for receiving as an input the common current command and outputting a second current command, the fluctuation detecting unit (300) includes a low-pass filter (301) having set therein a time constant determined for a purpose of noise removal; a cushioning circuit (310) which, when a change occurs in a value of an input signal, outputs a signal while mildening a value of the signal change per unit time; and a subtracter (303) for subtracting an output signal of the cushioning circuit (301) from an output signal of the low-pass filter (301) and outputting the common current command, the first current command creating unit (400) includes a cushioning circuit (410) which receives as an input the common current command and, when a change occurs in a value of an input signal, outputs a signal while rendering a value of the signal change per unit time larger than the value of the signal change of the cushioning circuit (310); a subtracter (401) for subtracting an output signal of the cushioning circuit (410) from the common current command and outputting a resulting difference; an amplifier (402) for amplifying an output signal of the subtracter (401); an amplifier (403) for amplifying the output signal of the cushioning circuit (410); a rating limiter (404) for limiting an output signal of the amplifier (403); a cushioning circuit (420) which receives as an input an output signal of the rating limiter (404) and, when a change occurs in a value of the input signal, outputs a signal while rendering a value of the signal change per unit time larger than the value of the signal change of the cushioning circuit (310); a subtracter (405) for subtracting an output signal of the cushioning circuit (420) from the output signal of the rating limiter (404) and outputting a resulting difference; and an adder (406) for adding an output signal of the amplifier (402) and an output signal of the subtracter (405) and outputting the first current command, and the second current command creating unit (500) includes an amplifier (501) for amplifying the common current command, a rating limiter (502) for limiting an output signal of the amplifier (501); and a cushioning circuit (510) which receives as an input an output signal of the rating limiter (502) and, when a change occurs in a value of the input signal, outputs the second current command while rendering a value of the signal change per unit time larger than the value of the signal change of the cushioning circuit (310).

Another constitution of the present invention is the above system stabilizing device, wherein the first current command creating unit (400) has a change-over switch (408) interposed between the subtracter (405) and the adder (406), and the change-over switch (408)

is in an ON state when the system stabilizing device in which a direct current charging unit connected to the power converter is formed from an electric double layer capacitor, and the system stabilizing device in which a direct current charging unit connected to the power converter is formed from a lead storage battery are making a cooperative run, but is in an OFF state when only the system stabilizing device in which the direct current charging unit connected to the power converter is formed from the electric double layer capacitor is making an isolated run.

Another constitution of the present invention is the above system stabilizing device, wherein when a cushioning time is $T_c$, one sampling period is $T_s$, and X is a limiting value, the cushioning circuits (310), (410), (420), (510) are each composed of a limiter having limiting characteristics defined as $\pm(X \cdot T_s/T_c)$, a delay circuit for delaying an inputted signal by one sampling period $T_s$ and outputting the delayed signal, a subtracter, and an adder, the subtracter subtracts an output signal of the delay circuit from the input signal of the cushioning circuit, and feeds a resulting difference to the limiter, the adder adds an output signal of the limiter and the output signal of the delay circuit, and outputs a resulting sum, the delay circuit delays a signal outputted from the adder by one sampling period $T_s$, and outputs the delayed signal, and a cushioning time (T3) set in the limiter of the cushioning circuit (310) is set to be longer than a cushioning time (T4) set in the limiter of each of the cushioning circuits (410), (420), (510).

Another constitution of the present invention is the above system stabilizing device, wherein the time constant for noise removal is set as T1, a time constant for setting a fluctuation detection time is set as T2, an arbitrarily set first cushioning time is set as T3, and a second cushioning time shorter than the first cushioning time T3 is set as T4, in each of the first to fourth fluctuation detecting blocks, the fluctuation detecting unit (300) performs computations with use of computing programs to carry out first order lag filtering of the input signal inputted to the fluctuation detecting block, with the time constant as T1, to determine a first filter signal, carry out first order lag filtering of the input signal inputted to the fluctuation detecting block, with the time constant as T2, to determine a second filter signal, milden a value of a signal change, per unit time, in the second filter signal with use of the first cushioning time T3 to determine a cushioning signal (a), and subtract the cushioning signal (a) from the first filter signal to determine a common current command ($I_{refd}0$), the first current command creating unit (400) performs computations with use of computing programs to milden a value of a signal change, per unit time, in the common current command ($I_{refd}0$) with use of the second cushioning time T4 to determine a cushioning signal (b), subtract the cushioning signal (b) from the common current command) ($I_{refd}0$) to determine a subtraction signal (c), and amplify the subtraction signal (c) to determine a current command ($I_{refd}11$), limit the cushioning signal (b) by a preset rated value to determine a limiter signal (d), milden a value of a signal change, per unit time, in the limiter signal (d) with use of the second cushioning time T4 to determine a cushioning signal (e), subtract the cushioning signal (e) from the limiter signal (d) to determine a current command ($I_{refd}12$), and add the current command ($I_{refd}11$) and the current command ($I_{refd}12$) to determine a current command ($I_{refd}1$), or determine the current command ($I_{refd}11$), unchanged, as a current command ($I_{refd}1$), and then output the determined current command ($I_{refd}1$), and the second current command creating unit (500) performs computations with use of computing programs to limit the common current command ($I_{refd}0$) by a preset rated value, then milden a value of a signal change, per unit time, in the limited command with use of the second cushioning time T4 to determine a current command ($I_{refd}2$), and output the current command ($I_{refd}2$).

EFFECTS OF THE INVENTION

According to the present invention, the first current control command with short charging and discharging times and the second current control command with long charging and discharging times are obtained from the fluctuation detecting block incorporated into the control unit of the system stabilizing device. Thus, the system stabilizing device using the electric double layer capacitor as the direct current charging unit can perform short-time high-speed charging and discharging suitable for the charging and discharging characteristics of the electric double layer capacitor by using the first current command. The system stabilizing device using the lead storage battery as the direct current charging unit can perform long-time charging and discharging involving rises in charging and discharging over time, which are suitable for the charging and discharging characteristics of the lead storage battery, by using the second current command.

Furthermore, the cushioning circuit is composed of the limiter, the delay circuit, the subtracter, and the adder. Thus, changes in the current command obtained show straight-line characteristics (linear changes). This makes it possible to easily perform control of the system stabilizing device and control over various instruments (generator), etc. acting in interlocking relationship with the system stabilizing device.

MODE FOR CARRYING OUT THE INVENTION

A mode for carrying out the present invention will be described in detail based on embodiments of the invention.

Embodiment 1

Figure 1:
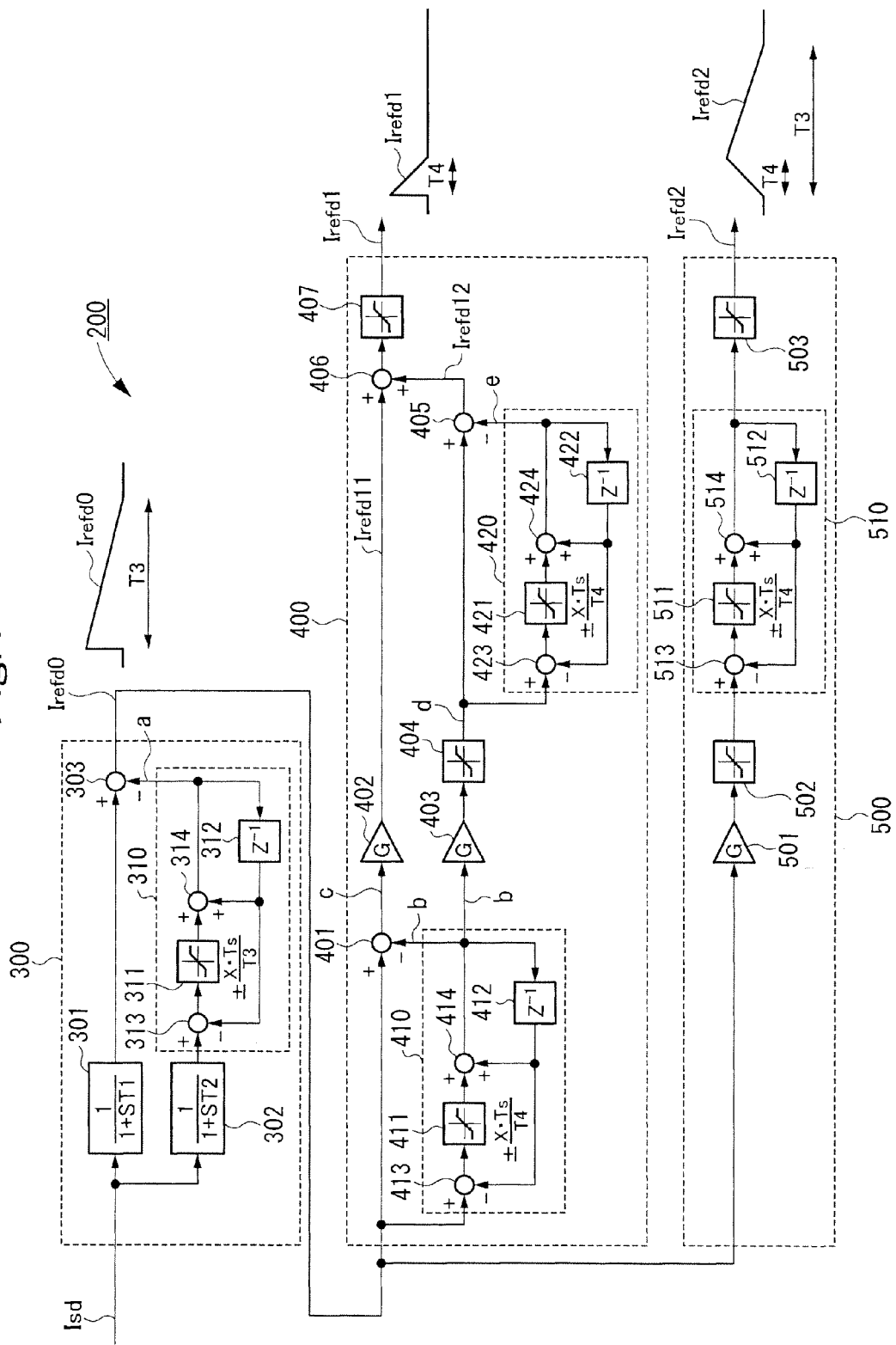
[FIG. 1] is a circuit diagram showing a fluctuation detecting block according to Embodiment 1 of the present invention.
Figure 8:
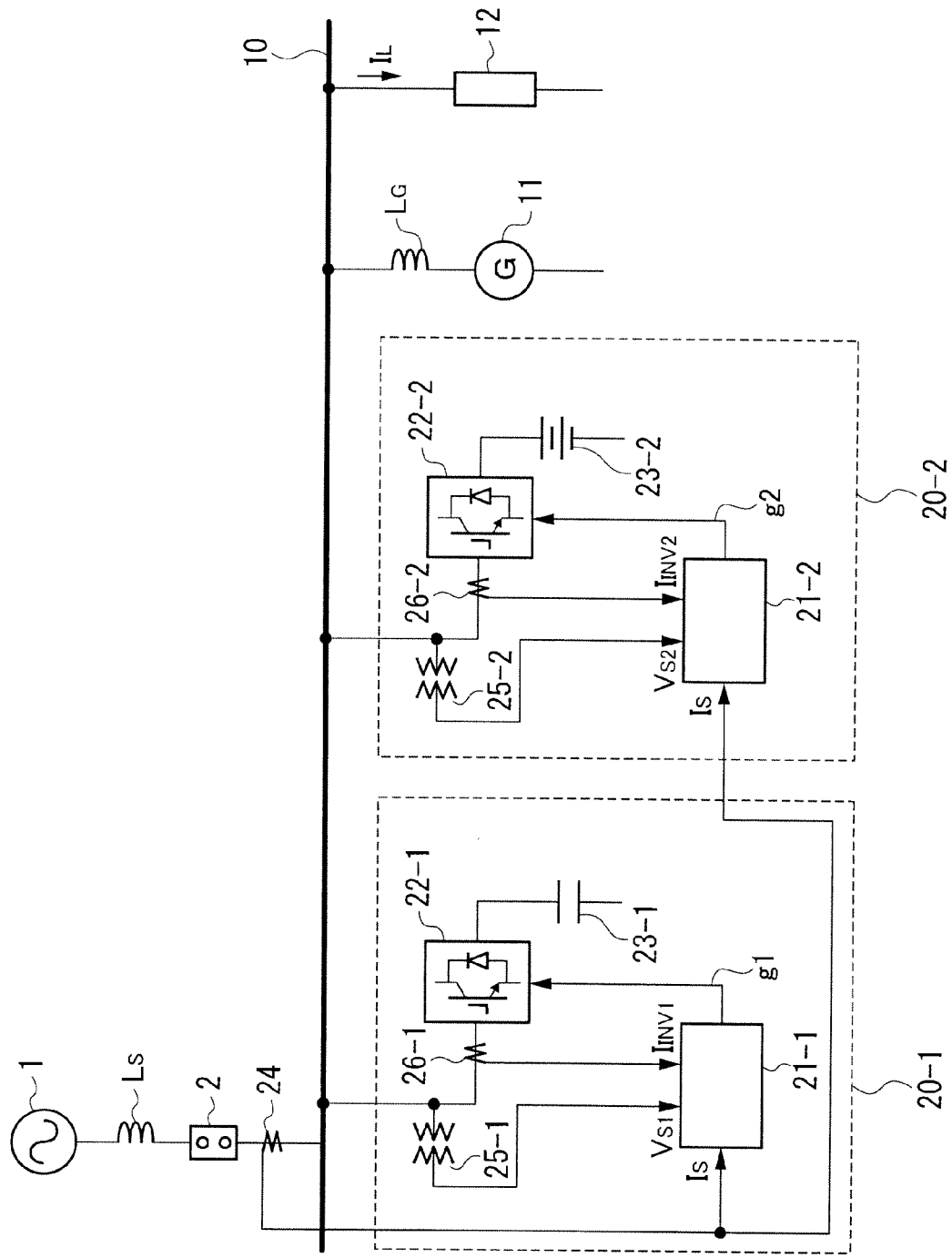
[FIG. 8] is a circuit configuration diagram showing the microgrid equipped with two system stabilizing devices.

FIG. 1 shows a fluctuation detecting block 200 according to Embodiment 1 of the present invention. The fluctuation detecting block 200 is applied to the first to fourth fluctuation detecting blocks 105, 106, 123, 124 (see FIG. 6) incorporated into the control units 21-1, 21-2 of the system stabilizing devices 20-1, 20-2 (see FIG. 8).

As shown in FIG. 1, the fluctuation detecting block 200 is composed of a fluctuation detecting unit 300, a first current command creating unit 400, and a second current command creating unit 500.

Figure 6:
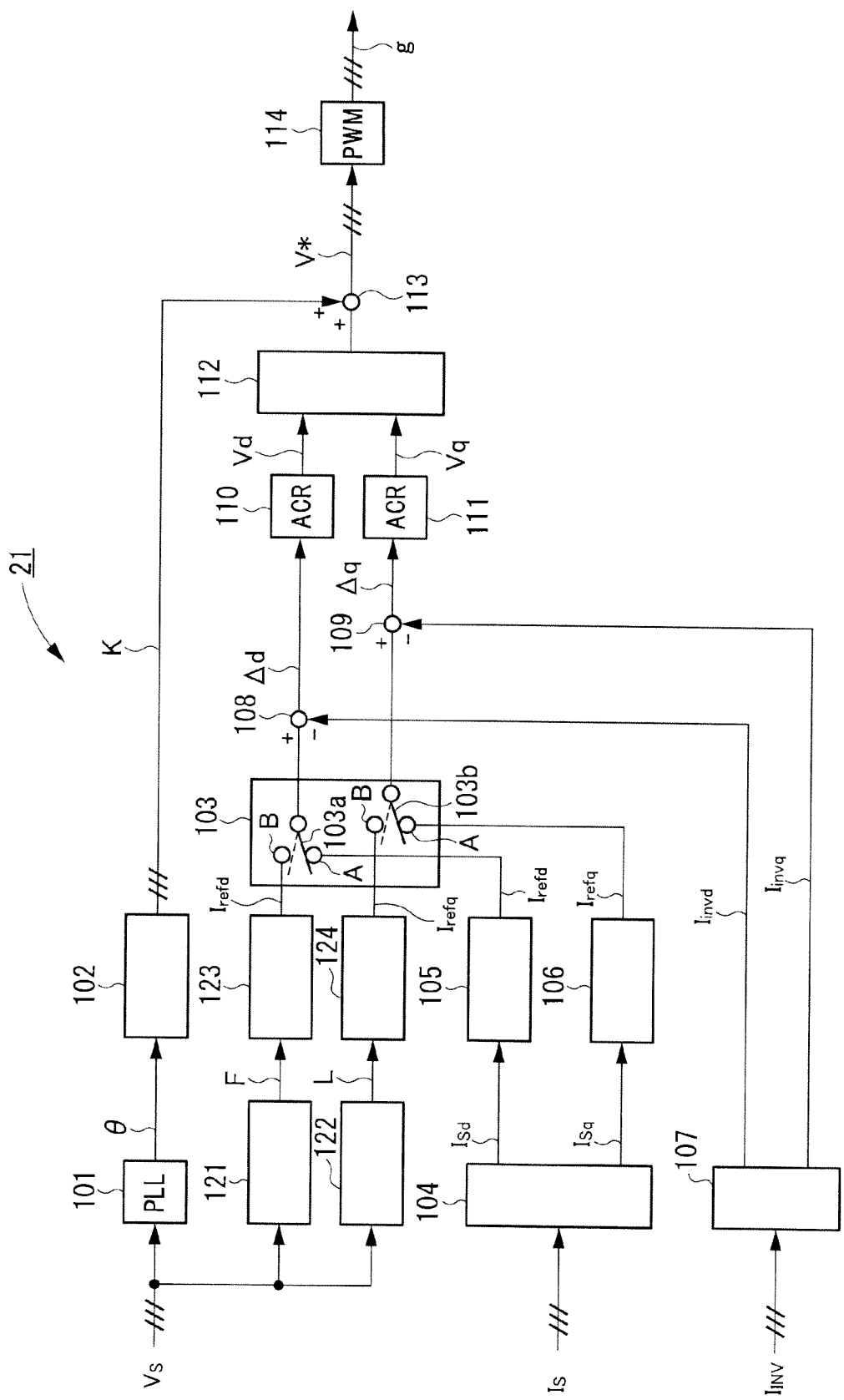
[FIG. 6] is a circuit diagram showing a control unit of the system stabilizing device.
Figure 7:
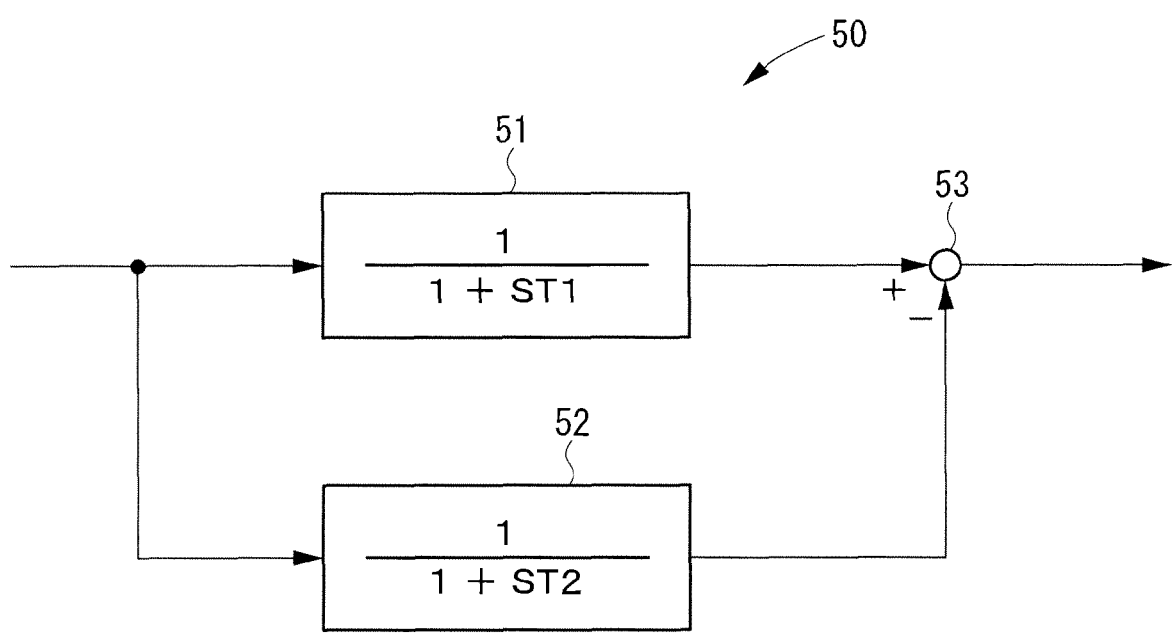
[FIG. 7] is a circuit diagram showing a conventional fluctuation detecting block.

The fluctuation detecting block 200 can be used as the fluctuation detecting blocks 105, 106, 123, 124 shown in FIG. 6.

(1) If the fluctuation detecting block 200 is used as the fluctuation detecting block 105 (see FIG. 6), the active component $I_{sd}$ of the system current is inputted to the fluctuation detecting unit 300, and the current command $I_{refd}$ for the active component is outputted from the first and second current command creating units 400 and 500.

(2) If the fluctuation detecting block 200 is used as the fluctuation detecting block 106 (see FIG. 6), the reactive component $I_{sq}$ of the system current is inputted to the fluctuation detecting unit 300, and the current command $I_{refq}$ for the reactive component is outputted from the first and second current command creating units 400 and 500.

(3) If the fluctuation detecting block 200 is used as the fluctuation detecting block 123 (see FIG. 6), the frequency signal F is inputted to the fluctuation detecting unit 300, and the current command $I_{refd}$ for the active component is outputted from the first and second current command creating units 400 and 500.

(4) If the fluctuation detecting block 200 is used as the fluctuation detecting block 124 (see FIG. 6), the amplitude signal L is inputted to the fluctuation detecting unit 300, and the current command $I_{refq}$ for the reactive component is outputted from the first and second current command creating units 400 and 500.

Further, the current command $I_{refd}$ or the current command $I_{refq}$, respectively, is outputted from the first and second current command creating units 400 and 500 of the fluctuation detecting block 200. In this case, the state of usage of the current command is as follows:

(1) If the fluctuation detecting block 200 is used as the fluctuation detecting block of the system stabilizing device 20-1 using the electric double layer capacitor as the direct current charging unit, the current command $I_{refd}1$ or the current command $I_{refq}1$ outputted from the first current command creating unit 400 is used, but the current command $I_{refd}2$ or the current command $I_{refq}2$ outputted from the second current command creating unit 500 is not used.

(2) If the fluctuation detecting block 200 is used as the fluctuation detecting block of the system stabilizing device 20-2 using the lead storage battery as the direct current charging unit, the current command $I_{refd}2$ or the current command $I_{refq}2$ outputted from the second current command creating unit 500 is used, but the current command $I_{refd}1$ or the current command $I_{refq}1$ outputted from the first current command creating unit 400 is not used.

In the following descriptions, the use of the fluctuation detecting block 200 as the fluctuation detecting block 105 (see FIG. 6) is explained, but the fluctuation detecting block 200 can also be used as the fluctuation detecting blocks 106, 123, 124 (see FIG. 6).

If the fluctuation detecting block 200 is used as the fluctuation detecting block 105 (see FIG. 6), the fluctuation detecting block 200 receives as an input the active component $I_{sd}$ of the system current, and the fluctuation detecting block 200 outputs the current command $I_{refd}1$ and the current command $I_{refd}2$.

The input and output states of the respective units 300, 400, 500 of the fluctuation detecting block 200 will be described first of all.

The fluctuation detecting unit 300 receives as an input the active component $I_{sd}$ of the system current, and outputs the common current command $I_{refd}0$.

The first current command creating unit 400 receives as an input the common current command $I_{refd}0$, and outputs the current command $I_{refd}1$. This current command $I_{refd}1$ has the property of rising instantaneously in the presence of a load fluctuation and decreasing linearly (gradually decreasing) over the course of a time T4. This current command $I_{refd}1$ is used as a current command of the system stabilizing device 20-1 equipped with the direct current charging unit 23-1 composed of an electric double layer capacitor.

The second current command creating unit 500 receives as an input the common current command $I_{refd}0$, and outputs the current command $I_{refd}2$. This current command $I_{refd}2$ has the property of increasing linearly (gradually increasing) over the course of a time T4 in the presence of a load fluctuation and then decreasing linearly (gradually decreasing) over the course of a time (T3-T4). This current command $I_{refd}2$ is used as a current command of the system stabilizing device 20-2 equipped with the direct current charging unit 23-2 composed of a lead storage battery.

Next, the respective units 300, 400, 500 will be described in detail.

First, the fluctuation detecting unit 300 will be described.

The fluctuation detecting unit 300 is composed of a low-pass filter 301, a low-pass filter 302, a subtracter 303, and a cushioning circuit 310.

The cushioning circuit 310 is composed of a limiter 311, a delay circuit 312, a subtracter 313, and an adder 314.

The low-pass filter 301 is a filter having first order lag characteristics, whose time constant is set to be the time constant T1. The time constant T1 is a time constant determined for the purpose of noise removal.

When receiving an input signal (the active component $I_{sd}$ of the system current), the low-pass filter 301 utilizes its filtering characteristics to filter the input signal.

The low-pass filter 302 is a filter having first order lag characteristics, whose time constant is set to be the time constant T2. The time constant T2 is a time constant determined for the purpose of setting the fluctuation detection time.

When receiving an input signal (the active component $I_{sd}$ of the system current), the low-pass filter 302 utilizes its filtering characteristics to filter the input signal.

The limiter 311 of the cushioning circuit 310 has limiting characteristics defined as $\pm(X \cdot T_s/T3)$.

T3 represents a cushioning time set at an arbitrary duration, $T_s$ represents one sampling period, and X represents a limiting value.

The cushioning time T3 sets the charging and discharging times of the system stabilizing device 20-2 equipped with the direct current charging unit 23-2 composed of a lead storage battery.

This limiter 311 limits the amount of change for one sampling period Ts. When the signal value of the signal inputted to the limiter 311 is a value between +X (upper limiting value) and −X (lower limiting value), the limiter 311 holds the signal value of the input signal as such, and outputs it. When the signal value of the signal inputted to the limiter 311 is above +X (upper limiting value), the limiter 311 allows the value to increase with a constant gradient for a predetermined time, and then limits the value to +X. When the signal value of the signal inputted to the limiter 311 is below −X (lower limiting value), the limiter 311 allows the value to decrease with a constant gradient for a predetermined time, and then limits the value to −X.

The delay circuit 312 has the property of delaying the inputted signal by one sampling period Ts and outputting the delayed signal. This delay circuit 312 can be constructed, for example, by a Z transformation circuit having such properties as to show $Z^{-1}$.

The subtracter 313 subtracts the output signal of the delay circuit 312 from the output signal of the low-pass filter 302 having the first order lag characteristics, and sends a signal corresponding to the difference to the limiter 311.

That is, the output signal of the delay circuit 312 is provided as negative feedback at the stage preceding the limiter 311.

The adder 314 adds the signal outputted from the limiter 311 and the signal outputted from the delay circuit 312, and outputs the sum.

That is, the output signal of the delay circuit 312 is provided as positive feedback at the stage succeeding the limiter 311.

The delay circuit 312 delays the output signal of the adder 314 by one sampling period $T_s$, and outputs the delayed signal.

As described above, the signal outputted from the delay circuit 312 is provided as negative feedback at the stage preceding the limiter 311, and is provided as positive feedback at the stage succeeding the limiter 83. Thus, the signal status is as follows:

The output of the subtracter 313 is "the present sampled value—the value after limiter processing performed one sampling period previously".

Thus, if the signal value inputted from the low-pass filter 302 to the subtracter 313 is +X or less, but −X or more, the signal value outputted from the limiter 311 is 0.

If the signal value inputted from the low-pass filter 302 to the subtracter 313 is above +X or below −X, on the other hand, the signal value outputted from the limiter 311 is a value whose upper limit value and lower limit value are restricted by the limiting values (+X, −X).

The output of the adder 314 is "the output of the limiter+the value after limiter processing performed one sampling period previously".

Thus, if the signal value inputted from the low-pass filter 302 to the subtracter 313 is above +X or below −X, the signal value outputted from the adder 314 linearly increases. That is, the signal value outputted from the adder 314 changes (increases or decreases) stepwise by the magnitude of the limiting value (+X or −X) for each sampling period $T_s$.

After all, when a change occurs in the value of the input signal, the cushioning circuit 310 mildens the value of the signal change per unit time, and outputs the signal.

The subtracter 303 subtracts the output signal of the adder 314 from the output signal of the low-pass filter 301 having the first order lag characteristics, and outputs the difference. A fluctuation component included in the input signal is outputted from the subtracter 303.

In the present embodiment, the common current command $I_{refd}0$ corresponding to the fluctuation component of the active component $I_{sd}$ of the system current is outputted from the subtracter 303 (fluctuation detecting unit 300).

the signal status in the fluctuation detecting unit 300 of the above-mentioned configuration will be described by reference to FIGS. 2(a) to 2(l). In FIGS. 2(a) to 2(l), "p.u." refers to a unit symbol, and 1 p.u. represents the rated value.

Figure 2:
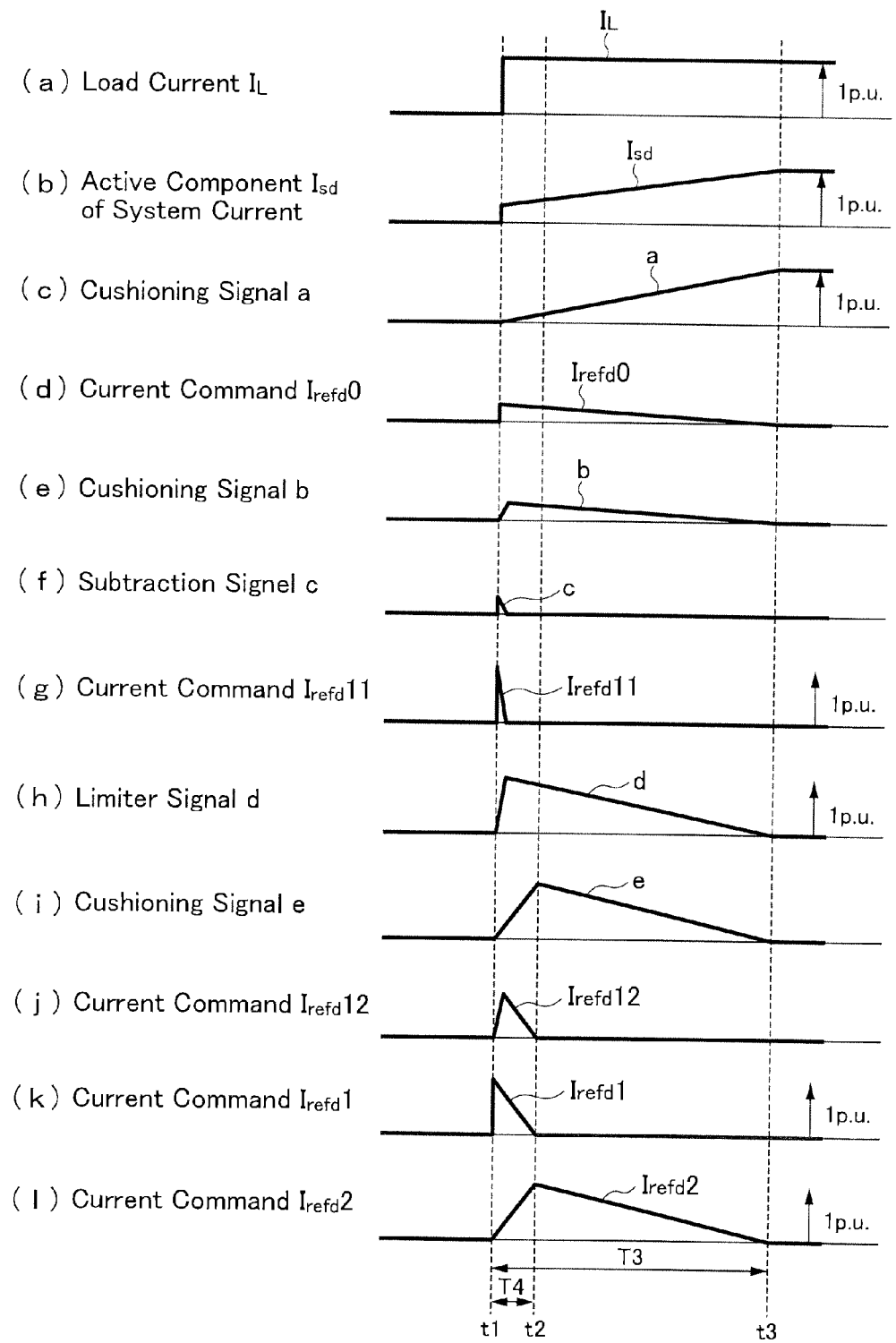
[FIGS. 2(*a*) to 2(*l*)] are characteristic charts showing current characteristics when Embodiment 1 was used.

The signal state, as shown in FIG. 2(a), is a state where the load sharply increases and the load current IL increases in a stepped form.

As shown in FIG. 2(b), the active component $I_{sd}$ of the system current instantaneously rises at a load fluctuation instant t1, and then linearly increases (gradually increases) until an instant t3 over the course of a time T3. On this occasion, a system stabilizing control (current compensating) action by the system stabilizing devices 20-1, 20-2 is performed.

The active component $I_{sd}$ of the system current is filtered by the low-pass filter 302, and is subjected to cushioning by the cushioning circuit 310 to milden the value of the signal change per unit time. Thus, a cushioning signal a as shown in FIG. 2(c) is outputted from the cushioning circuit 310.

The subtracter 303 subtracts the cushioning signal a from the active component $I_{sd}$ of the system current, thereby outputting the common current command $I_{refd}0$ as shown in FIG. 2(d).

Next, the first current command creating unit 400 will be described.

The first current command creating unit 400 is composed of a subtracter 401, amplifiers 402, 403, a rating limiter 404, a subtracter 405, an adder 406, a rating limiter 407, and cushioning circuits 410, 420.

The cushioning circuits 410, 420 are composed of limiters 411, 421, delay circuits 412, 422, subtracters 413, 423, and adders 414, 424, respectively.

The limiters 411, 421 of the cushioning circuits 410, 420 each have limiting characteristics defined as $\pm(X \cdot T_s/T4)$.

T4 represents a cushioning time set at an arbitrary duration shorter than the time T3, $T_s$ represents one sampling period, and X represents a limiting value.

The cushioning time T4 sets the charging and discharging times of the system stabilizing device 20-1 equipped with the direct current charging unit 23-1 composed of an electric double layer capacitor.

The actions of the cushioning circuits 410, 420 are basically the same as the actions of the cushioning circuit 310, although the cushioning time is different. That is, when a change occurs in the value of the input signal to the cushioning circuits 410, 420, the value of the signal change per unit time is rendered larger than the value of the signal change in the cushioning circuit 310, and the so processed signal is outputted.

The signal status in the first current command creating unit 400 of the above-described configuration will be described by reference to FIGS. 2(a) to 2(l).

The common current command $I_{refd}0$ outputted from the fluctuation detecting unit 300 is subjected to cushioning by the cushioning circuit 410 to milden the value of the signal change per unit time. Thus, a cushioning signal b as shown in FIG. 2(e) is outputted from the cushioning circuit 410.

The subtracter 401 subtracts the cushioning signal b from the common current command $I_{refd}0$ to output a common subtraction signal c as shown in FIG. 2(f).

The amplifier 402 amplifies the subtraction signal c to output a current command $I_{refd}11$ as shown in FIG. 2(g).

The cushioning signal b is amplified by the amplifier 403, and the amplified signal has its signal value limited to the rated value by the rating limiter 404. As a result, a limiter signal d as shown in FIG. 2(h) appears.

The limiter signal d is subjected to cushioning by the cushioning circuit 420 to have the value of the signal change per unit time mildened. Thus, a cushioning signal e as shown in FIG. 2(i) is outputted from the cushioning circuit 420.

The cushioning signal e has the property of linearly increasing (gradually increasing) over the course of a time T4 from an instant t1 until an instant t2, and linearly decreasing (gradually decreasing) over the course of a time (T3-T4) from the instant t2 until an instant t3.

The subtracter 405 subtracts the cushioning signal e from the limiter signal d, thereby outputting a current command $I_{refd}12$ as shown in FIG. 2(j). The duration during which the current command $I_{refd}12$ is outputted is T4.

This current command $I_{refd}12$ serves as a current command for inhibiting system current fluctuations from remaining when the system stabilizing device 20-1 and the system stabilizing device 20-2 are making a cooperative run.

The adder 406 adds the current command $I_{refd}11$ and the current command $I_{refd}12$, thereby outputting a current command $I_{refd}1$ as shown in FIG. 2(k). This current command $I_{refd}1$ has its signal value limited to the rated value by the rating limiter 407, and is then outputted.

The current command $I_{refd}1$ has a signal width (length of time base) as small as T4, and has the property of rising in a short time and falling in a short time. Thus, the current command $I_{refd}1$ is suitable for use as a current command of the system stabilizing device 20-1 which performs high speed charging and discharging in a short time.

The relationship among the current command $I_{refd}11$, the current command $I_{refd}12$ and the current command $I_{refd}1$ will be described.

The current command $I_{refd}11$, as shown in FIG. 2(g), has a very small signal width (length of time base) (further small as compared with T4), and has the property of rising in a very short time and falling in a short time. Thus, the current command $I_{refd}11$ reacts to fluctuations sensitively, is either outputted, or stops being outputted.

When the system stabilizing device 20-1 and the system stabilizing device 20-2 are making a cooperative run, therefore, there is a possibility that an appropriate current command $I_{refd}11$ will not be obtained under the influence of stabilizing control on the side of the system stabilizing device 20-2.

Thus, in order to prevent a situation in which the current command $I_{refd}11$ sensitively reacts and does not become an appropriate current command any more, the current command $I_{refd}12$ is added to the current command $I_{refd}11$ to form a current command $I_{refd}1$.

Next, the second current command creating unit 500 will be described.

The second current command creating unit 500 is composed of an amplifier 501, rating limiters 502, 503, and a cushioning circuit 510.

A limiter 511 of the cushioning circuit 510 has limiting characteristics defined as $\pm(X \cdot T_s/T4)$.

T4 represents a cushioning time set at an arbitrary duration shorter than the time T3, $T_s$ represents one sampling period, and X represents a limiting value.

The actions of the cushioning circuit 510 are basically the same actions as those of the cushioning circuit 310, although the cushioning time is different. That is, when a change occurs in the value of the input signal to the cushioning circuit 510, the value of the signal change per unit time is rendered larger than the value of the signal change in the cushioning circuit 310, and the so processed signal is outputted.

The signal status in the second current command creating unit 500 of the above-described configuration will be described by reference to FIGS. 2(a) to 2(l).

The common current command $I_{refd}0$ is amplified by the amplifier 501, and the amplified command has its signal value limited to the rated value by the rating limiter 502. Further, the limited signal is subjected to cushioning by the cushioning circuit 510, whereby the value of its signal change per unit time is mildened. Thus, a current command $I_{refd}2$ as shown in FIG. 2(l) is outputted from the cushioning circuit 510. This current command $I_{refd}2$ has its signal value limited to the rated value by the rating limiter 503, and is then outputted.

The current command $I_{refd}2$ has a signal width (length of time base) as large as T3, and has the property of rising in a time T4 and then falling in a time (T3-T4). Thus, the current command $I_{refd}2$ is suitable for use as a current command of the system stabilizing device 20-2 which achieves rises in charging and discharging over time to perform long-term charging and discharging.

The relationship between the current command $I_{refd}1$ and the current command $I_{refd}2$ will be described.

The current command $I_{refd}1$ is outputted only in a term T4 (t1 to t2), while the current command $I_{refd}2$ gradually increases in the term T4 (t1 to t2) and gradually increases in a term T4-T3 (t2 to t3).

If attention is focused on the term T4, the current command $I_{refd}1$ rises instantaneously at the instant t1, and then gradually decreases, whereas the current command $I_{refd}2$ gradually increases, beginning at the instant t1. As seen here, in the term T4, the current command $I_{refd}1$ decreases, and the current command $I_{refd}2$ increases on the contrary. Thus, a changeover from the current command $I_{refd}1$ to the current command $I_{refd}2$ can be made smoothly.

Thus, the system stabilizing device 20-1, which has the direct current charging unit 23-1 composed of the electric double layer capacitor and thus performs short-time charging and discharging, is controlled by the current command $I_{refd}1$. On the other hand, the system stabilizing device 20-2, which has the direct current charging unit 23-2 composed of the lead storage battery and thus performs long-time charging and discharging, is controlled by the current command $I_{refd}2$. By so doing, satisfactory control can be effected, without interference between system stabilizing controls by the system stabilizing device 20-1 and the system stabilizing device 20-2.

In this case, moreover, there is no need to monitor the output powers and output currents of the system stabilizing device 20-1, the system stabilizing device 20-2 and the dispersed generation plant 11.

In the present embodiment, the cushioning circuits 310, 410, 420, 430 are composed, respectively, of the limiters 311, 411, 421, 431, the delay circuits 312, 412, 422, 432, the subtracters 313, 413, 423, 433, and the adders 314, 414, 424, 434. Thus, changes in the resulting current commands $I_{refd}1$, $I_{refd}2$ show linear characteristics.

Hence, not only the control of the system stabilizing devices 20-1, 20-2, but also the control of the various instruments (generator) acting in a manner interlocked with the system stabilizing devices can be easily performed.

Embodiment 2

Figure 3:
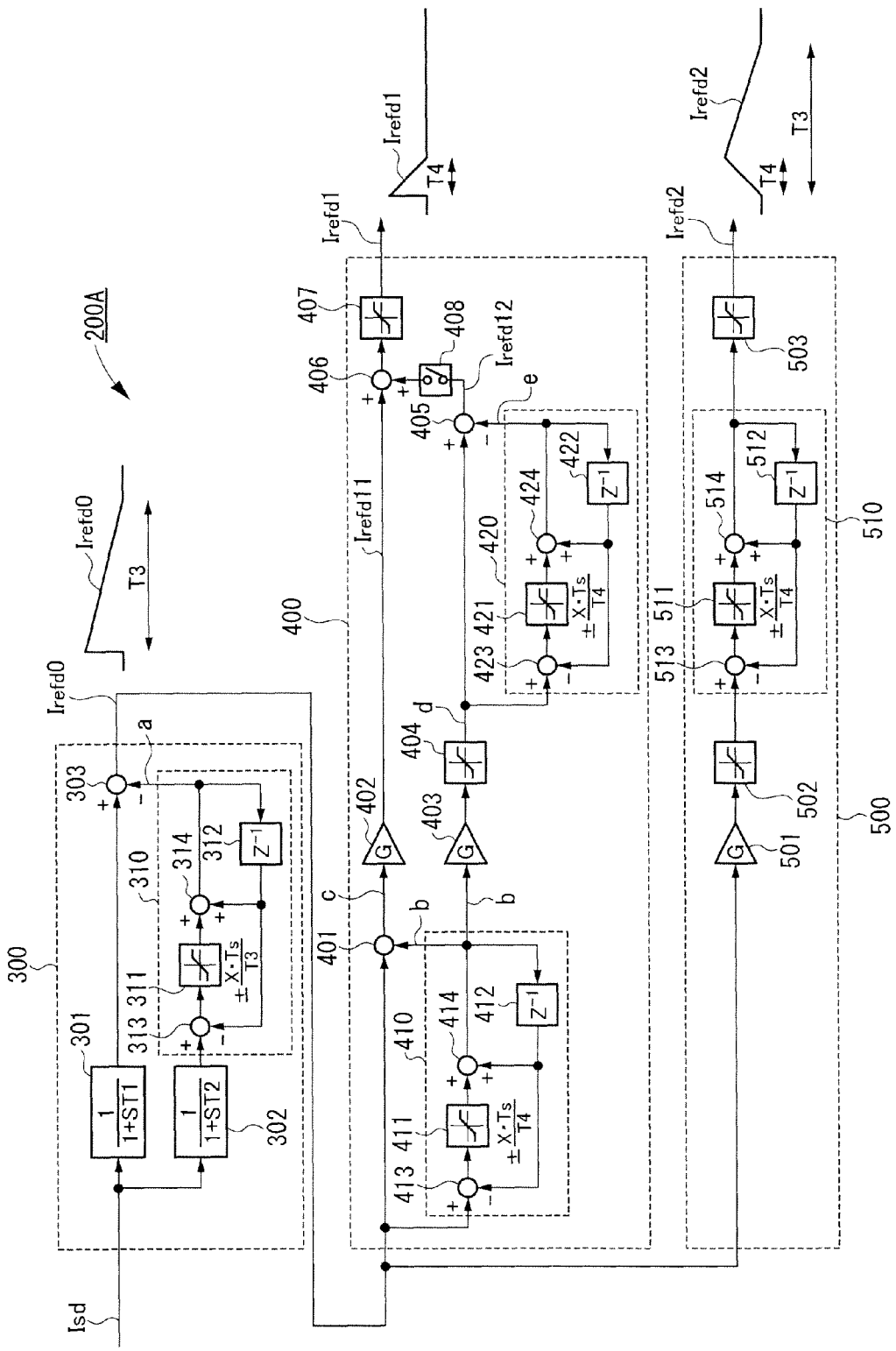
[FIG. 3] is a circuit diagram showing a fluctuation detecting block according to Embodiment 2 of the present invention.
Figure 4:
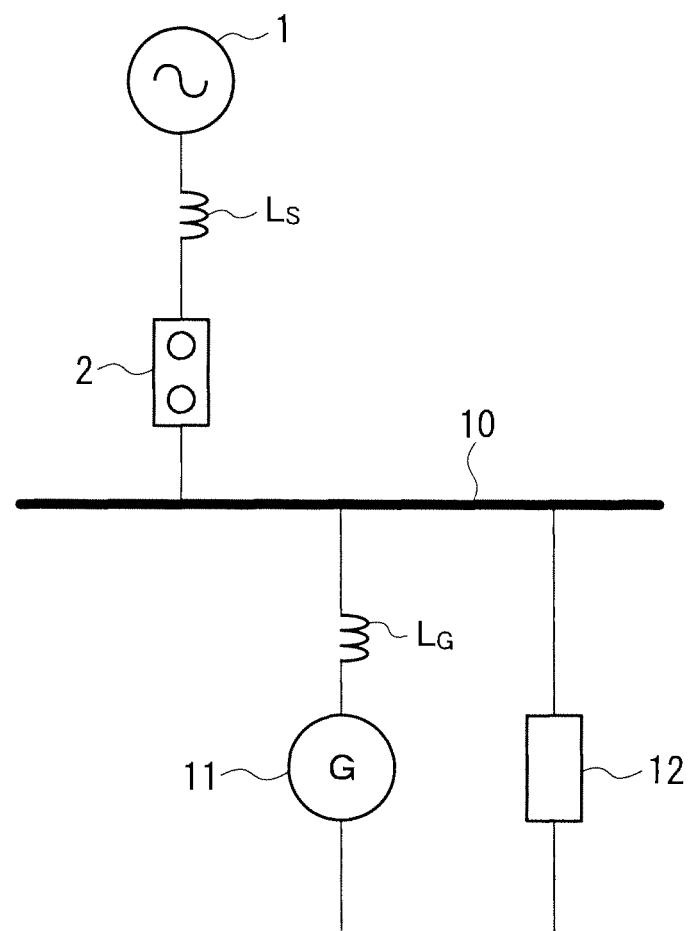
[FIG. 4] is a circuit configuration diagram showing a microgrid.
Figure 5:
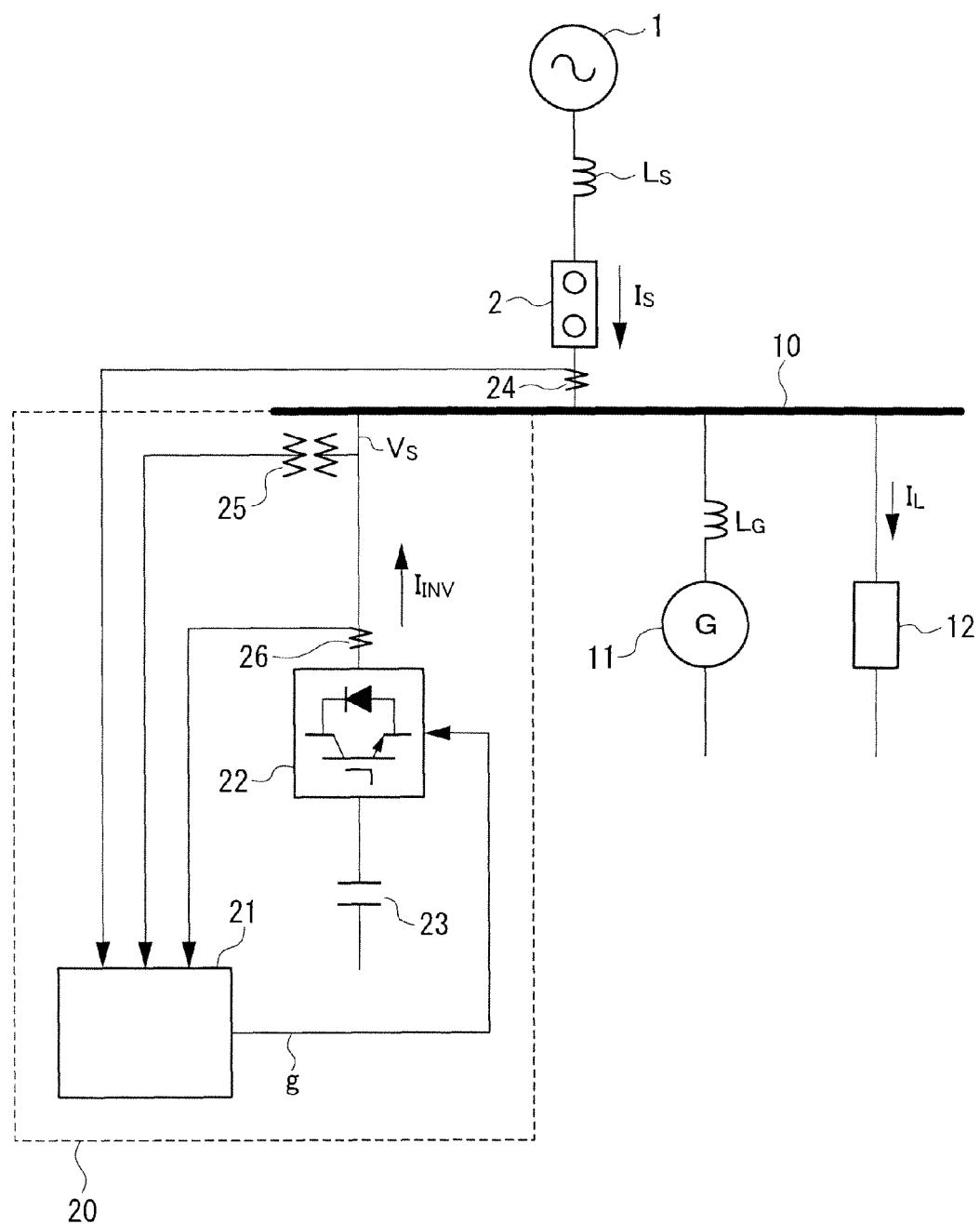
[FIG. 5] is a circuit configuration diagram showing the microgrid equipped with one system stabilizing device.

FIG. 3 shows a fluctuation detecting block 200A according to Embodiment 2 of the present invention. The fluctuation detecting block 200A has a change-over switch 408 further provided in the fluctuation detecting block 200 shown in FIG. 1.

This change-over switch 408 is interposed between the subtracter 405 and the adder 406. The change-over switch 408 is turned on when the system stabilizing device 20-1 having the direct current charging unit 23-1 formed from the electric double layer capacitor and the system stabilizing device 20-2 having the direct current charging unit 23-2 formed from the lead storage battery are making a cooperative run, but is turned off when only the system stabilizing device 20-1 having the direct current charging unit 23-1 formed from the electric double layer capacitor is run in isolation.

Thus, during a cooperative run, $I_{refd}1=I_{refd}11+I_{refd}12$, but during an isolated run, $I_{refd}1=I_{refd}11$.

Since, during the isolated run, $I_{refd}1=I_{refd}11$ as described above, the current command $I_{refd}1$ does not include the current command $I_{refd}12$ which inhibits system current fluctuations from remaining.

When only the system stabilizing device 20-1 is run in isolation, the system stabilizing device 20-1 may perform charging and discharging for a longer time than the time T9, provided that $I_{refd}1=I_{refd}11+I_{refd}12$.

However, as in the present embodiment, when only the system stabilizing device 20-1 is run isolatedly, the change-over switch 408 is turned off to attain the current command $I_{refd}1=I_{refd}11$, thereby excluding the current command $I_{refd}12$ which inhibits system current fluctuations from remaining. By so doing, the system stabilizing device 20-1, which carries out short-time charging and discharging, can be prevented from performing charging and discharging actions for a longer time than the time T4.

The examples of the above Embodiments 1, 2 are the examples of using the fluctuation detecting block 200, 200A as the fluctuation detecting block 105. However, the fluctuation detecting block 200, 200A can be used as the fluctuation detecting blocks 106, 123, 124, with the circuit configuration being unchanged.

In using the fluctuation detecting block 200, 200A as the fluctuation detecting block 106, the active component $I_{cs}$ of the system current may be replaced by the reactive component $I_{cd}$ of the system current, and the current commands $I_{refd}0$, $I_{refd}11$, $I_{refd}12$, $I_{refd}1$, $I_{refd}2$ for the active component may be replaced by the current commands $I_{refq}0$, $I_{refq}11$, $I_{refq}12$, $I_{refq}1$, $I_{refq}2$ for the reactive component, in FIG. 1 and FIG. 3.

In using the fluctuation detecting block 200, 200A as the fluctuation detecting block 123, the active component $I_{cs}$ of the system current may be replaced by the frequency signal F in FIG. 1 and FIG. 3.

In using the fluctuation detecting block 200, 200A as the fluctuation detecting block 124, the active component $I_{cs}$ of the system current may be replaced by the amplitude signal L, and the current commands $I_{refd}0$, $I_{refd}11$, $I_{refd}12$, $I_{refd}1$, $I_{refd}2$ for the active component may be replaced by the current commands $I_{refq}0$, $I_{refq}11$, $I_{refq}12$, $I_{refq}1$, $I_{refq}2$ for the reactive component, in FIG. 1 and FIG. 3.

Embodiments 1, 2 can also be realized by performing computations using computing programs (software) preset in a computer.

That is, with the embodiments utilizing software, the fluctuation detecting blocks 200, 200A can be constructed as computing programs (software) incorporated into (set in) a computer as hardware, the computing programs for performing necessary computations for the fluctuation detecting blocks 200, 200A.

With the fluctuation detecting blocks 200, 200A according to the embodiments utilizing software, the following arithmetic operations or computations are performed by computing programs:

(1) In accordance with the computing programs, the time constant for noise removal is set as T1, the time constant for setting the fluctuation detection time is set as T2, an arbitrarily set first cushioning time is set as T3, and a second cushioning time shorter than the first cushioning time T3 is set as T4.

After completion of the above settings, the fluctuation detecting block 200, 200A performs the following computations with the use of the computing programs:

(2) The fluctuation detection unit (300) performs computations with the use of the computing programs to carry out the first order lag filtering of the input signal inputted to the fluctuation detecting block, with the time constant as T1, to determine a first filter signal, carry out the first order lag filtering of the input signal inputted to the fluctuation detecting block, with the time constant as T2, to determine a second filter signal, milden the value of the signal change, per unit time, in the second filter signal with the use of the first cushioning time T3 to determine a cushioning signal (a), and subtract the cushioning signal (a) from the first filter signal to determine the common current command ($I_{refd}0$).

The first current command creating unit (400) performs computations with the use of the computing programs to milden the value of the signal change, per unit time, in the common current command ($I_{refd}0$) with the use of the second cushioning time T4 to determine a cushioning signal (b), subtract the cushioning signal (b) from the common current command ($I_{refd0}$) to determine a subtraction signal (c), and amplify the subtraction signal (c) to determine a current command ($I_{refd}11$), limit the cushioning signal (b) by a preset rated value to determine a limiter signal (d), milden the value of a signal change, per unit time, in the limiter signal (d) with the use of the second cushioning time T4 to determine a cushioning signal (e), subtract the cushioning signal (e) from the limiter signal (d) to determine a current command ($I_{refd}12$), and either add the current command ($I_{refd}11$) and the current command ($I_{refd}12$) to determine a current command ($I_{refd}1$), or determine the current command ($I_{refd}11$), unchanged, as a current command ($I_{refd}1$), and then output the determined current command ($I_{refd}1$).

The second current command creating unit (500) performs computations with the use of the computing programs to limit the common current command ($I_{refd}0$) by a preset rated value, then milden the value of a signal change, per unit time, in the limited command with the use of the second cushioning time T4 to determine a current command ($I_{refd}2$), and output the current command ($I_{refd}2$).

DESCRIPTION OF THE NUMERALS

1 Power system
2 Circuit breaker
10 Distribution system
11 Dispersed generation plant
12 Load
20, 20-1, 20-2 System stabilizing device
21, 21-1, 21-2 Control unit
22, 22-1, 22-2 Power converter
23, 23-1, 23-2 Direct current charging unit
24, 26, 26-1, 26-2 Current detector
25, 25-1, 25-2 Voltage detector
105, 106, 123, 124, 200, 200A Fluctuation detecting block
300 Fluctuation detecting unit
400 First current command creating unit
500 Second current command creating unit

The invention claimed is:

1. A system stabilizing device provided in a distribution system which, when a power system is normal, is connected to the power system, and when an abnormality occurs in the power system, is cut off from the power system, and to which a dispersed generation plant and a load are connected, the system stabilizing device having a control unit, and a power converter which performs a converting action and an inverting action in accordance with a gate signal fed from the control unit, wherein when the power system is normal, the control unit determines an active component of a system current and a reactive component of the system current, the system current flowing from the power system into the distribution system;

determines a fluctuation component included in the active component of the system current by a first fluctuation detecting block, and uses the fluctuation component as a current command for the active component;

determines a fluctuation component included in the reactive component of the system current by a second fluctuation detecting block, and uses the fluctuation component as a current command for the reactive component;

further determines an active component of a converter current and a reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, and when the abnormality occurs in the power system, the control unit determines, from a system voltage of the distribution system, a frequency signal showing a frequency of the system voltage and an amplitude signal showing an amplitude of the system voltage;

determines a fluctuation component included in the frequency signal by a third fluctuation detecting block, and uses the fluctuation component as a current command for an active component;

determines a fluctuation component included in the amplitude signal by a fourth fluctuation detecting block, and uses the fluctuation component as a current command for a reactive component;

further determines the active component of the converter current and the reactive component of the converter current, the converter current being inputted to and outputted from the power converter; and outputs the gate signal for reducing a current deviation for the active component, which is a deviation between the current command for the active component and the active component of the converter current, to zero, and also reducing a current deviation for the reactive component, which is a deviation between the current command for the reactive component and the reactive component of the converter current, to zero, the first to fourth fluctuation detecting blocks are each composed of a fluctuation detecting unit (300) for outputting a common current command; a first current command creating unit (400) for receiving as an input the common current command and outputting a first current command; and a second current command creating unit (500) for receiving as an input the common current command and outputting a second current command, the fluctuation detecting unit (300) includes a low-pass filter (301) having set therein a time constant determined for a purpose of noise removal; a cushioning circuit (310) which, when a change occurs in a value of an input signal, outputs a signal while mildening a value of the signal change per unit time; and a subtracter (303) for subtracting an output signal of the cushioning circuit (301) from an output signal of the low-pass filter (301) and outputting the common current command, the first current command creating unit (400) includes a cushioning circuit (410) which receives as an input the common current command and, when a change occurs in a value of an input signal, outputs a signal while rendering a value of the signal change per unit time larger than the value of the signal change of the cushioning circuit (310); a subtracter (401) for subtracting an output signal of the cushioning circuit (410) from the common current command and outputting a resulting difference; an amplifier (402) for amplifying an output signal of the subtracter (401); an amplifier (403) for amplifying the output signal of the cushioning circuit (410); a rating limiter (404) for limiting an output signal of the amplifier (403); a cushioning circuit (420) which receives as an input an output signal of the rating limiter (404) and, when a change occurs in a value of the input signal, outputs a signal while rendering a value of the signal change per unit time larger than the value of the signal change of the cushioning circuit (310); a subtracter (405) for subtracting an output signal of the cushioning circuit (420) from the output signal of the rating limiter (404) and outputting a resulting difference; and an adder (406) for adding an output signal of the amplifier (402) and an output signal of the subtracter (405) and outputting the first current command, and the second current command creating unit (500) includes an amplifier (501) for amplifying the common current command, a rating limiter (502) for limiting an output signal of the amplifier (501); and a cushioning circuit (510) which receives as an input an output signal of the rating limiter (502) and, when a change occurs a the value of the input signal, outputs the second current command while rendering a value of the signal change per unit time larger than the value of the signal change of the cushioning circuit (310).

2. The system stabilizing device according to claim 1, wherein the first current command creating unit (400) has a change-over switch (408) interposed between the subtracter (405) and the adder (406), and the change-over switch (408)

is in an ON state when the system stabilizing device in which a direct current charging unit connected to the power converter is formed from an electric double layer capacitor, and the system stabilizing device in which a direct current charging unit connected to the power converter is formed from a lead storage battery are making a cooperative run, but is in an OFF state when only the system stabilizing device in which the direct current charging unit connected to the power converter is formed from the electric double layer capacitor is making an isolated run.

3. The system stabilizing device according to claim 1, wherein when a cushioning time is $T_c$, one sampling period is $T_s$ and x is a limiting value, the cushioning circuits (310), (410), (420), (510) are each composed of a limiter having limiting characteristics defined as $\pm(x \cdot T_s/T_c)$, a delay circuit for delaying an inputted signal by one sampling period $T_s$ and outputting the delayed signal, a subtracter, and an adder, the subtracter subtracts an output signal of the delay circuit from the input signal of the cushioning circuit, and feeds a resulting difference to the limiter, the adder adds an output signal of the limiter and the output signal of the delay circuit, and outputs a resulting sum, the delay circuit delays a signal outputted from the adder by one sampling period $T_s$, and outputs the delayed signal, and a cushioning time (T3) set in the limiter of the cushioning circuit (310) is set to be longer than a cushioning time (T4) set in the limiter of each of the cushioning circuits (410), (420), (510).

4. The system stabilizing device according to claim 1, wherein the time constant for noise removal is set as T1, a time constant for setting a fluctuation detection time is set as T2, an arbitrarily set first cushioning time is set as T3, and a second cushioning time shorter than the first cushioning time T3 is set as T4, in each of the first to fourth fluctuation detecting blocks, the fluctuation detecting unit (300) performs computations with use of computing programs to carry out first order lag filtering of the input signal inputted to the fluctuation detecting block, with the time constant as T1, to determine a first filter signal, carry out first order lag filtering of the input signal inputted to the fluctuation detecting block, with the time constant as T2, to determine a second filter signal, milden a value of a signal change, per unit time, in the second filter signal with use of the first cushioning time T3 to determine a cushioning signal (a), and subtract the cushioning signal (a) from the first filter signal to determine a common current command ($I_{refd}0$), the first current command creating unit (400) performs computations with use of computing programs to milden a value of a signal change, per unit time, in the common current command ($I_{refd}0$) with use of the second cushioning time T4 to determine a cushioning signal (b), subtract the cushioning signal (b) from the common current command ($I_{refd}0$) to determine a subtraction signal (c), and amplify the subtraction signal (c) to determine a current command ($I_{refd}11$), limit the cushioning signal (b) by a preset rated value to determine a limiter signal (d), milden a value of a signal change, per unit time, in the limiter signal (d) with use of the second cushioning time T4 to determine a cushioning signal (e), subtract the cushioning signal (e) from the limiter signal (d) to determine a current command ($I_{refd}12$), and add the current command ($I_{refd}11$) and the current command ($I_{refd}12$) to determine a current command ($I_{refd}1$), or determine the current command ($I_{refd}11$), unchanged, as a current command ($I_{refd}1$), and then output the determined current command ($I_{refd}1$), and the second current command creating unit (500) performs computations with use of computing programs to limit the common current command ($I_{refd}0$) by a preset rated value, then milden a value of a signal change, per unit time, in the limited command with use of the second cushioning time T4 to determine a current command ($I_{refd}2$), and output the current command ($I_{refd}2$).

* * * * *